US012266212B1

(12) United States Patent
Gupta

(10) Patent No.: US 12,266,212 B1
(45) Date of Patent: Apr. 1, 2025

(54) SYSTEM AND METHOD OF TRACKING A TRAJECTORY OF AN OBJECT ACROSS FRAMES OF AN INPUT MEDIA

(71) Applicant: Deep Media Inc., Oakland, CA (US)

(72) Inventor: Rijul Gupta, Oakland, CA (US)

(73) Assignee: Deep Media Inc., Oakland, CA (US)

( * ) Notice: Subject to any disclaimer, the term of this patent is extended or adjusted under 35 U.S.C. 154(b) by 367 days.

(21) Appl. No.: 17/959,388

(22) Filed: Oct. 4, 2022

Related U.S. Application Data

(60) Provisional application No. 63/262,116, filed on Oct. 5, 2021.

(51) Int. Cl.
*G06V 40/16* (2022.01)

(52) U.S. Cl.
CPC .......... *G06V 40/161* (2022.01); *G06V 40/171* (2022.01); *G06V 2201/07* (2022.01)

(58) Field of Classification Search
CPC . G06V 40/161; G06V 40/171; G06V 2201/07
See application file for complete search history.

(56) References Cited

U.S. PATENT DOCUMENTS

| | | | | |
|---|---|---|---|---|
| 8,351,647 B2 * | 1/2013 | Sharma | ................... | G06Q 30/02 382/103 |
| 11,830,289 B2 * | 11/2023 | Yellepeddi | ............ | G06F 1/1686 |
| 2007/0201726 A1 * | 8/2007 | Steinberg | ............... | G06V 40/16 382/103 |
| 2019/0050629 A1 * | 2/2019 | Olgiati | ...................... | G06T 7/20 |
| 2020/0364446 A1 * | 11/2020 | Yoo | ......................... | G06V 40/28 |
| 2022/0028109 A1 * | 1/2022 | Kang | ................... | G06V 40/161 |
| 2022/0157081 A1 * | 5/2022 | Pan | ........................ | G06N 3/045 |
| 2022/0189038 A1 * | 6/2022 | Yamazaki | ............... | G06T 7/292 |
| 2023/0353885 A1 * | 11/2023 | Lin | ....................... | G06V 40/171 |

* cited by examiner

*Primary Examiner* — Wesley J Tucker
(74) *Attorney, Agent, or Firm* — Nicholas Pfeifer; Smith & Hopen, P.A.

(57) ABSTRACT

An object trajectory analysis system and method that is usable to determine a probable match between objects across subsequent or related input frames of an input media, thereby tracking a movement of an object, such as a target face, across the subsequent or related input frames. The system receives an input media including a plurality of input frames for analysis, such that the target face is determined to be present through facial landmark analyses and positional analyses. Calculating an overlap value between bounding boxes that are associated with detected target faces in subsequent frames, the system determines whether a consistent face is present within the subsequent frames. The system then performs the analyses across multiple frames to track a relative position of the target face, and can use landmark detection to predict a presence of and characteristics of the target face during intermediary frames lacking detection of the target face.

20 Claims, 5 Drawing Sheets

Comparing the location of the bounding boxes and facial landmarks in one or more input frames before and after the intermediate TND input frame(s)
302

↓

Calculating an average location of the bounding box and facial landmarks across the predetermined number of preceding and succeeding input frames
304

↓

Distributing the average locational values of the bounding boxes and the facial landmarks evenly across the intermediate TND input frame(s) to extrapolate the locations of the bounding boxes and the facial landmarks
306

Fig. 3

SYSTEM AND METHOD OF TRACKING A TRAJECTORY OF AN OBJECT ACROSS FRAMES OF AN INPUT MEDIA

CROSS-REFERENCE TO RELATED APPLICATIONS

This nonprovisional application is a continuation of and claims priority to provisional application No. 63/262,116, entitled "SYSTEM AND METHOD OF TRACKING A TRAJECTORY OF AN OBJECT ACROSS FRAMES OF AN INPUT MEDIA," filed Oct. 5, 2021.

BACKGROUND OF THE INVENTION

1. Field of the Invention

This invention relates, generally, to object detection and tracking systems and methods. More specifically, it relates to a system and method of tracking a trajectory of one or more objects, such as a human face, across frames, or still images, or a media input, such as a video, string of sequential still images, or motion picture.

2. Brief Description of the Prior Art

Over the past few decades, object detection processes have been implemented in still images for implementations varying from tumor detection to online security questions used to verify whether a user is a human or an artificial intelligence. In most of these processes, back-end calculations are undertaken to distill an entire still image into a series of recognized objects; for example, in tumor detection implementations based on x-ray images, a back end of the system distinguishes between bones, normal tissues, and potential tumor nodules. Various approaches have been suggested in the prior art to perform and improve the performance of these object detection mechanisms, such that more recent examples include detection systems that are trained on datasets to automatically detect a presence or an absence of a nodule.

While these approaches have improved over recent years, typical systems are restricted to analyses based on singular still images. An inherent limitation of the restriction to still images is that moving images, such as video files that include a plurality of frames (or still images) per second, are incapable of being efficiently processed through these prior art systems. To that end, where object detection is required based on a media input that includes a plurality of related, or linked, frames, these prior art systems must perform individual analyses of each frame in a separate manner. In a specific example, tracking movement of an individual object across frames of a media input including a plurality of frames proves challenging for the current methods used in the art. The effect is that the computational requirements of such an analysis results in a highly inefficient process that can only be undertaken by using vast amount of resources.

In addition, specifically relating to facial detection and tracking across frames of a media input, attempts have been made to isolate singular frames within a larger media input including a plurality of frames to detect an identity of one or more humans or animals displayed within the media input. Ensuring that subsequent frames show the same humans and/or animals has proven challenging, particularly as a selected face moves throughout the media input across subsequent frames. Recently, attempts have been made to utilize facial processing, such as facial detection (detecting a presence of a face) and/or facial landmark analyses (detecting one or more identifying characteristics associated with a particular face through analyses such as Euclidean distance metrics for the landmarks), to track a face across subsequent frames of an input media. However, efficiently and accurately tracking a trajectory of the face across frames of the input media has proven to be challenging, particularly when an intervening frame does not show the face.

Accordingly, what is needed is a more efficient and effective system and method of tracking a trajectory (i.e., movement) of one or more objects across frames of a media input, such as a video including multiple frames. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a system and method of tracking trajectory(s) of one or many objects across frames of a media input is now met by a new, useful, and nonobvious invention.

The novel method includes a step of receiving an input media including a plurality of input frames. A presence of one or more target faces within one or more of the plurality of input frames is detected by calculating one or more facial bounding boxes associated with each target face in each frame. The calculated one or more facial bounding boxes associated with each target face in each frame is stored within in a memory. For a first input frame of the plurality of input frames, the method includes a step of calculating a first set of bounding boxes having an area determined by an area of the respective target face. As such, the area of each first bounding box is greater than the area of the respective target face, such that the first bounding box is placed around the target face on the first input frame.

In addition, for the first input frame of the plurality of input frames, the method includes a step of calculating one or more facial landmarks associated with each target face and associating the calculated one or more facial landmarks with the first input frame.

Moreover, for the first input frame of the plurality of input frames, the method may include a step of calculating one or more pieces of demographic information associated with each target face and associating the calculated one or more pieces of demographic information with the first input frame. Demographic information may include elements such as prediction of race/age/gender/facial attributes and/or may include similarity information from a Siamese network (such as that provided by FaceNet) or other contrastive learning network (such as that provided by SimCLR) and/or the outputs of perceptual layers of a classification network (such as that provided by VGGFace).

In addition, for the first input frame of the plurality of input frames, the method may include a step of calculating one or more image heuristic associated with each target face and associating the calculated one or more image heuristic with the first input frame. Image heuristics may include color histogram or LUTs (look-up tables), Hu-Moments, and gradient information.

Next, for a second input frame of the plurality of input frames, the method includes a step of calculating a second bounding box having an area determined by the area of the respective target face. As such, the area of the second bounding box is greater than the area of the respective target face, such that the second bounding box is placed around the target face on the second input frame. In addition, for the second input frame of the plurality of input frames, the method includes a step of calculating one or more facial landmarks and/or one or more pieces demographic information and/or one or more image heuristics associated with each target face and associating the calculated one or more facial landmarks with the second input frame.

The method includes a step of comparing the calculated bounding boxes of each face in the first input frame with the calculated bounding boxes of each face in the second input frame to ensure an agreement between the calculated bounding boxes of each face in the first input frame with the calculated bounding boxes of a face in the second input frame. The method also includes a step of calculating an overlap value between each face in the first set bounding boxes and each face in the second set of bounding boxes. The overlap value is based on an intersection over union (IOU) between the first bounding box and the second bounding box. Based on the agreement between the calculated bounding box of the first input frame with the calculated bounding box of the second input frame, and based on a determination that the overlap value meets a threshold of 0.2, the method includes a step of tracking each target face from the first input frame of the plurality of input frames to the second input frame of the plurality of input frames.

In an embodiment, the method includes a step of comparing the calculated one or more facial landmarks and/or one or more pieces of demographic information and/or one or more image heuristics to refine initial results from multi-object image tracking based on IOU calculations.

In an embodiment, the method includes a step of receiving an audio media that is associated with the input media. The step of detecting the presence of the target face may include a step of detecting an audio component of the audio media that is associated with the target face, such that the target face is associated with an audio output.

The novel system includes a processor and a non-transitory computer-readable medium operably coupled to the processor. The computer-readable medium has computer-readable instructions stored thereon that, when executed by the processor, cause a target face tracking system to track a target face across input frames of an input media by executing instructions including the steps outlined above.

An embodiment of the present invention includes a system and method of tracking a target face across successive input frames of an input media. The system includes a processor and a non-transitory computer-readable medium operably coupled to the processor. The computer-readable medium includes computer-readable instructions stored thereon that, when executed by the processor, cause the facial tracking system to track the target face across input frames of the input media by executing the following instructions. The method also includes the following steps below.

The present invention first acquires a plurality of input frames corresponding to the input media. A presence of the target face is then detected within at least a subset of input frames from the plurality of input frames. In some embodiments, detecting the presence of the target face within at least the subset of input frames from the plurality of input frames includes detecting a presence of any faces within each of the plurality of input frames; computing bounding boxes for each face detected in each input frame of the plurality of input frames and identifying the location of each bounding box in each input frame; and calculating an overlap value between a first bounding box on an initial input frame and each of the bounding boxes in successive input frames. The overlap value can be based on an intersection over union between the first bounding box and the bounding boxes in the successive input frames.

After calculating the overlap values, the present invention then determines if the overlap value between the first bounding box and any bounding boxes in successive input frames meets a threshold value. When the overlap value for a particular bounding box meets the threshold value, the present invention confirms that the target face has been detected in the successive frame on which the particular bounding box is located. In some embodiments, the threshold overlap value is at least 0.2 per 25 frames per second.

The present invention further determines a location of the target face in each of the input frames in which the target face was detected. In addition, the present invention determines whether there is an interruption in detection of target faces in one or more intermediate input frames in the plurality of input frames and then determines if the interruption meets a predetermined threshold value. The predetermined threshold in the interruption in the detection of target faces in one or more intermediate input frames can be equal to or less than 11 frames or equal to or less than 4 seconds.

Responsive to determining that the interruption meets the predetermined threshold, the present invention identifies a location of a target bounding box on a predetermined number of input frames preceding the interruption. Each target bounding box has an area determined by the target face and at least partially encloses the target face. The present invention also identifies a location of one or more facial landmarks associated with the target face for each of the preceding input frames. Likewise, the present invention identifies a location of a target bounding box on a predetermined number of input frames succeeding the interruption. Again, each target bounding box has an area determined by the target face and at least partially encloses the target face.

A location of one or more facial landmarks associated with the target face for each of the succeeding input frames is also identified. In some embodiments, the predetermined number of preceding and succeeding input frames used in calculating the predicted location of the predicted bounding box and predicted facial landmarks on each of the intermediate input frames is between 1 and 5 input frames.

A predicted location of a predicted bounding box is then calculated on each of the intermediate input frames on which there was an interruption in the detection of the target face. The predicted location is based on the identified locations of the target bounding boxes on the preceding input frames and the succeeding input frames. Calculating the location of the predicted bounding box can include calculating an average location of the bounding boxes from the identified locations of the target bounding boxes on the preceding input frames and the succeeding input frames and extrapolating the average location of the bounding boxes across the one or more intermediate input frames on which there was an interruption in the detection of the target face.

Once the predicted bounding boxes are calculated, a predicted location of one or more facial landmarks is calculated for each of the intermediate input frames on which there was the interruption in the detection of the target face. The predicted location is based on the identified locations of the one or more facial landmarks of the target faces on the preceding input frames and the succeeding input frames.

The present invention can further provide image content in each of the predicted bounding boxes to a crop-align generator. In addition, the present invention can provide the predicted location of the predicted bounding box and predicted facial landmarks of the target faces on each of the intermediate input frames to the crop-align generator.

In some embodiments, responsive to detecting multiple bounding boxes in a particular successive input frame that meet the threshold overlap value, the present invention compares a relative location of one or more facial landmarks of the target face in the initial input frame with a relative location of one or more facial landmarks of each face in each of the multiple bounding boxes to ensure a threshold level of agreement between the relative locations of the one or more facial landmarks of the initial input frame with the relative locations of the one or more facial landmarks of the successive input frame. Based on meeting the threshold agreement between the relative locations one or more facial landmarks of the initial input frame with the relative locations one or more facial landmarks of one of the multiple bounding boxes, the present invention identifies the bounding box that meets the threshold agreement as a correct bounding box having the target face.

Some embodiments further include receiving an audio media that is associated with the input media. In such instances, the step of detecting the presence of the target face further comprises detecting an audio component of the audio media that is associated with the target face, such that the target face is associated with an audio output.

An object of the invention is to effectively track one or more target objects, such as a face, across subsequent input frames of an input media, such as a video, motion picture, or other series of still images, including during situations in which the target object is partially obstructed or not detected in one or more intermediary input frames, thereby accurately determining whether a target object is present within an input frame and reducing false negatives.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 3 is a flowchart of an embodiment of predicting bounding boxes and facial landmarks.

DETAILED DESCRIPTION OF THE INVENTION

Figure 1:
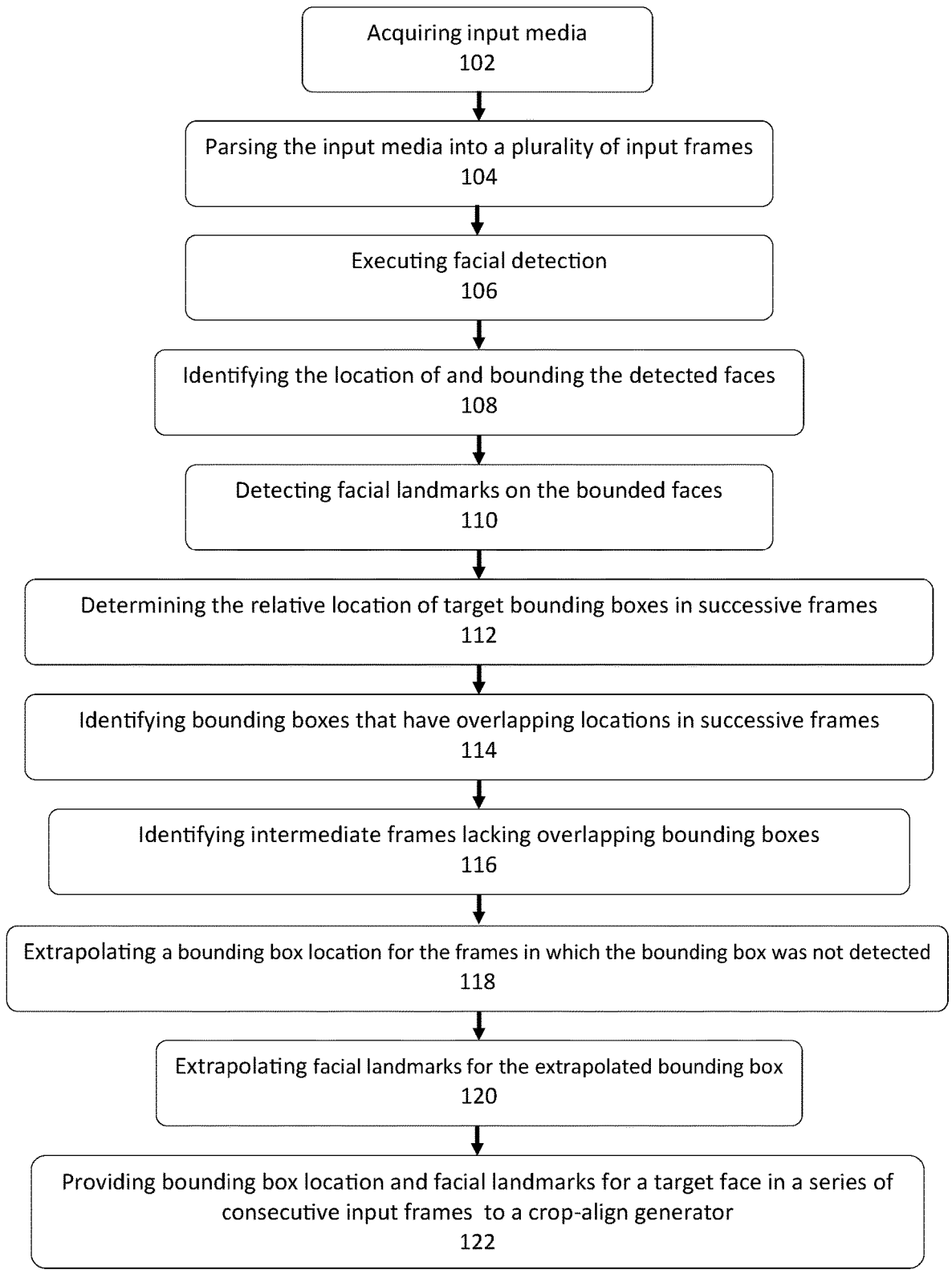
FIG. 1 is a flowchart of an embodiment of the present invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

All numerical designations are approximations which are varied up or down by increments of 1.0 or 0.1, as appropriate. It is to be understood, even if it is not always explicitly stated that all numerical designations are preceded by the term "about." As used herein, "about" or "approximately" refers to being within an acceptable error range for the particular value as determined by one of ordinary skill in the art, which will depend in part on how the value is measured or determined. As used herein, the term "about" refers to ±10% of the numerical; it should be understood that a numerical including an associated range with a lower boundary of greater than zero must be a non-zero numerical, and the term "about" should be understood to include only non-zero values in such scenarios.

As used herein, the term "input media" includes a series of still images, a video including a plurality of frames, a motion picture include a plurality of frames, or any other series of still images or frames that are related to each other, such as through the series of still images or frames being contemporaneously linked together. As used herein, the term "input frame" includes an individual one of a plurality of still frames that can be derived from a video or motion picture.

The present invention includes an object trajectory analysis system and method that is configured to determine a probable match between objects across consecutive or related input frames of an input media, thereby tracking a movement of an object across the subsequent or related input frames. As noted above, object detection has been performed on still images for purposes such as detecting a presence or an absence of a nodule within the still image. However, detecting an object across multiple still images has proven to be difficult since typical object detection occurs for each still image on an individual, separate basis. Accordingly, the present invention includes a system and method that tracks an object across multiple still images to track a movement/trajectory thereof for further processing. The object trajectory analysis system is described in greater detail in the sections below.

In an embodiment of the system, an input media is acquired or selected for processing, with the input media including a plurality of input frames. An example of an input media is a video file that includes a plurality of input frames for each second of the video file, such as a single input frame per second, 30 input frames per second, 60 input frames per second, or any other ratio of input frames per second that is known in the art. The input media includes one or more objects displayed therein, such that an embodiment of the input media includes one or more objects that translate between locations across different input frames of the input media. For example, in an embodiment, a first input frame shows a ball located on the right side of the first input frame. During one or more subsequent input frames, the ball translates from the right side of the input frame in a direction toward a left side of the input frame. As the ball translates from the right side to the left side of the input frames, the input media captures the motion of the ball during the translation. In this embodiment, the ball can be referred to as a target object for analysis by the system and method.

In another embodiment, a first input frame shows one or more human, animal, or other anthropomorphized object (collectively referred to as an animated character) that includes facial components similar to a typical human face, such as eyes, a nose, and/or a mouth. When the animated character speaks during one or more input frames of the input media, a mouth component of the animated character moves in response to the speech. Since the input media includes a plurality of input frames, during subsequent frames, the mouth component continues to move until the animated character discontinues speech. As the mouth component moves across subsequent frames, the input media captures the motion of the mouth component. In this embodiment, the mouth component can be referred to as a target object for analysis by the system and method.

The system and method described herein is used to track the motion, or trajectory, of the target object (such as the ball or the face) across subsequent frames. While the description below focuses on an embodiment including one or more faces that are detected and tracked, it should be appreciated that other target objects can be similarly detected and tracked through the system and method described herein.

Referring now to FIG. 1, during the trajectory tracking analysis, the system acquires or receives the input media that is selected for processing at step 102. Acquiring the input media may be performed using any video or image capturing device known to a person of ordinary skill in the art, including but not limited to cameras and video recorders. In addition, the input media may be received, wirelessly or via wire(s), from any recording device or from any data transferring method known to a person of ordinary skill in the art. Likewise, the input media may be retrieved, wirelessly or via wire(s), from any data store known to a person of ordinary skill in the art using one or more networks known to a person of ordinary skill in the art.

If the input media is in the form of a video, the present invention parses the video into a plurality of input frames at step 104. The step of parsing the frames may be achieved using known systems and methods for converting videos into still frames.

In some embodiments, the system performs a series of preprocessing steps to adjust the resolution as described in a related US application filed by the same inventors having application Ser. No. 17/954,406, which is incorporated herein by reference. Likewise, the resolution reversion steps described in the same application may be executed as described therein.

After the input frames are acquired, and after any preprocessing, the system performs an initial facial processing analysis on each of the input frames or on a subset of successive input frames. Hereinafter the reference to "input frames" in the detailed description section means all or a subset of input frames unless otherwise specified.

The initial facial processing analysis includes detecting a presence of one or more faces in the input frames at step 106, identifying the location of the detected faces and bounding the one or more faces within a bounding box or other identifying target boundary at step 108, and detecting one or more facial landmarks for associated with the detected face(s) within the bounding boxes at step 110. The system performs steps 106-110 for each input frame. The system stores the information related to the detected face(s), such as the x,y coordinates of the location of the bounding boxes/detected face(s), and the one or more associated landmarks in a memory for further processing later in the method, which will be described in detail below.

The facial processing analysis can be executed by an AI/ML system, such as a neural network (NN) (e.g., a convolutional neural network or a multi-task cascade convolutional neural network). The system incorporates artificial intelligence/machine learning/deep learning approaches to identify whether an input frame includes one or more faces, identifies the location of the face(s), bounds (and in some embodiments crops) the face(s) and identifies the facial landmarks of the bounded/cropped face(s). In addition, the system can be a trained system, which learned on training data how to execute these same steps. Nonlimiting examples include Dlib, 3DDFA_V2, MediaPipe, HRNet.

The system attempts to detect every face in every frame. However, facial detection systems are not always perfect and will fail to identify faces in certain situations for various reasons. Failure to identify a certain face across multiple frames could have a drastic negative impact on facial manipulation systems such as generative adversarial network (GAN) generators tasked with reanimating a face across multiple frames. The present invention uses bounding box trajectory and the facial landmark trajectory across a multitude of input frames to estimate where the same face should be when that face is not detected in one or more intermediate frames. To do so, the system tracks the same individual's face throughout the input frames using bounding box overlap, facial landmarks, and/or facial identification algorithms.

In some embodiments, each detected face will be tracked starting from an initial input frame. In some embodiments, a one or more faces will be selected to be tracked through consecutive input frames. The face being tracked is referred to as the "target face," but it should be understood that there could be multiple faces that need to be tracked across multiple frames and thus there could be multiple target faces that are tracked during facial trajectory analysis of the input media. The following steps 112-120 are performed for one or more target faces and can be performed for every detected face in the input frames.

Starting with an initial input frame and a first target face, the system identifies the location of a bounding box around the first target face in the initial input frame. The system then analyzes the location of all detected faces and their corresponding bounding boxes in each of the subsequent frames to determine whether the location of the bounding box of the target face (also referred to as the "target bounding box") in the first input frame overlaps in location with any bounding boxes in the subsequent input frames at step 112. The system identifies bounding boxes in subsequent input frames that have overlapping locations in the frames as being target bounding boxes in the subsequent frames at step 114. The system also identifies any intermediate frames that lack a target bounding box at step 116. If there are any intermediate frames that lack a target bounding box, the system extrapolates the location of a target bounding box for the intermediate frame that lacks a target bounding box at step 118. Finally, the system predicts/extrapolates the facial landmarks for the predicted/extrapolated bounding box at step 120. The location data for the predicted bounding box and predicted facial landmarks is then provide to a crop-align generator at step 122. Each of the foregoing steps 112-120 will be explained in greater detail below.

It should be noted that while the description herein refers to starting with an initial or first input frame and then considering successive or subsequent input frames, the temporal direction in considering the bounding boxes in input frames can start from the last input frame and consider previous input frames relative to the organization of the input media. In addition, the initial input frame in the trajectory analysis can be any frame from the input media and the next considered frame can move in a direction towards the start of the input media or towards the end of the input media. The term "initial input frame" simply refers to the first frame considered when tracking a particular target face.

It should also be noted that since the system can perform trajectory analysis on every face in the input media and a particular target face can appear at a random input frame and remain for some indeterminate number of temporally related input frames, the initial frame for each target face will likely vary from one target face to another when every face is analyzed in the input media.

Figure 2:
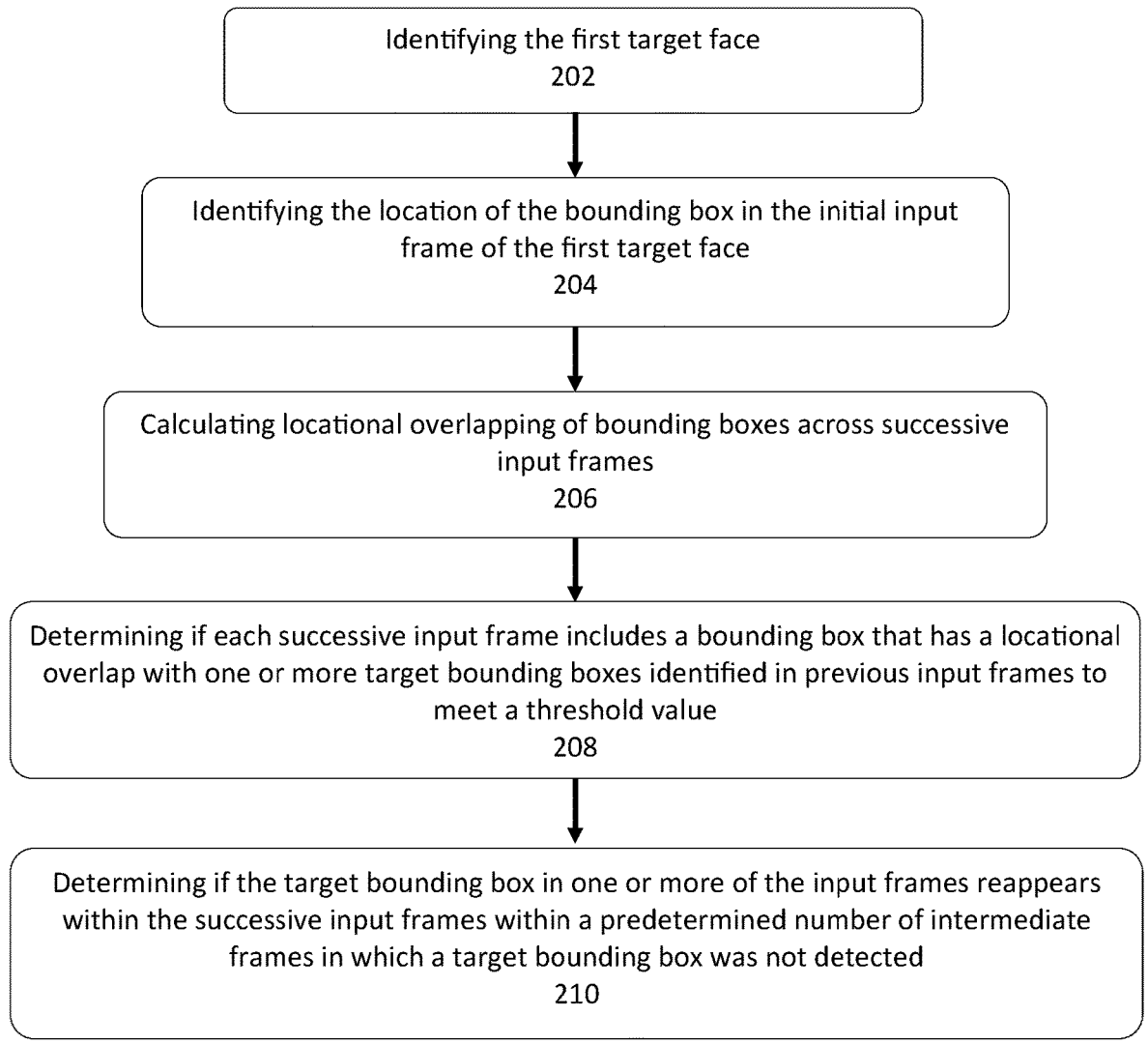
FIG. 2 is a flowchart of an embodiment of the determination of whether bounding boxes in successive input frames include target faces.
Figure 4:
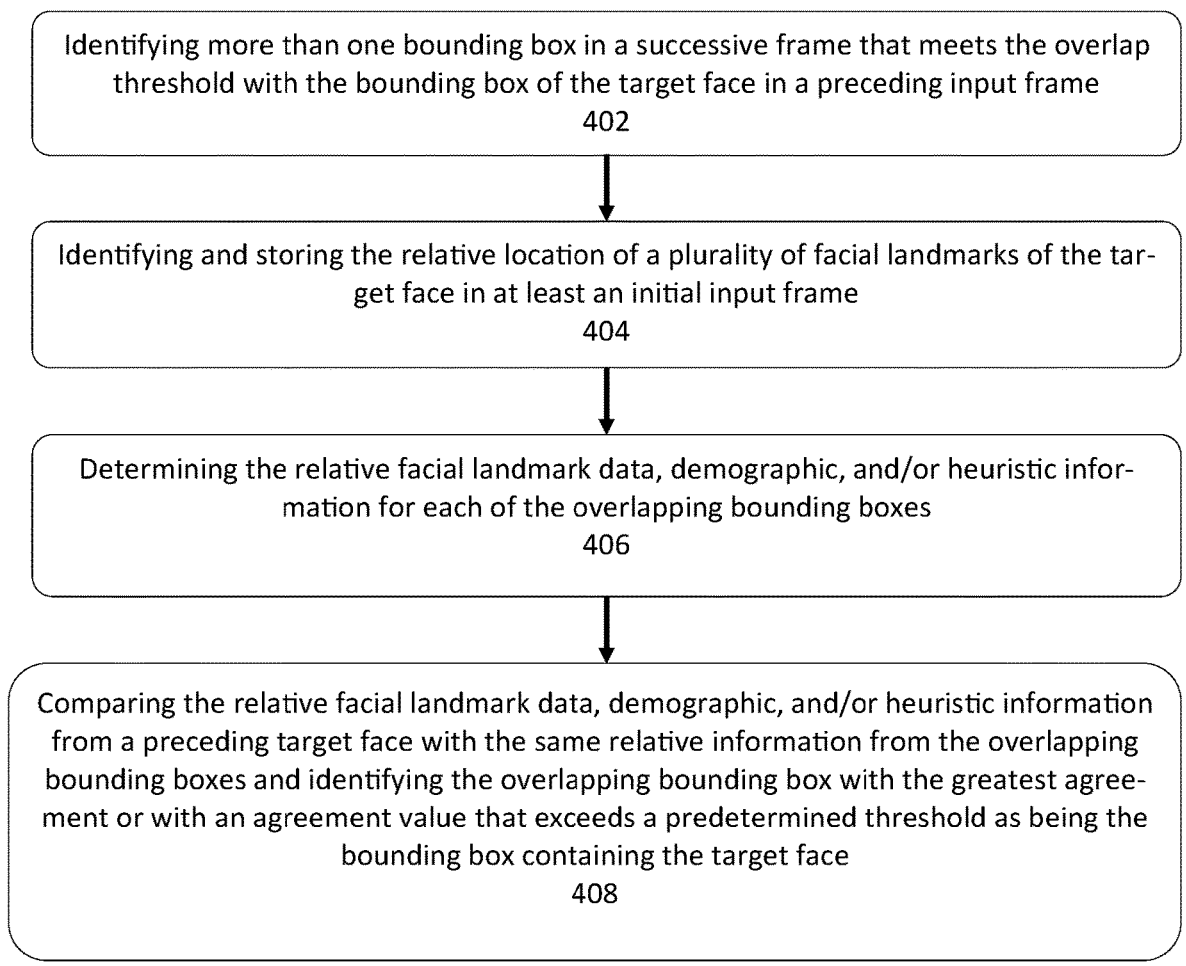
FIG. 4 is a flowchart of an embodiment of identifying a target bounding box from multiple overlapping bounding boxes.

Referring now to FIG. 2, the system selects a first target face in an initial input frame for analysis at step 202. The system then identifies a location of the target bounding box of the first target face in the initial input frame at step 204. The system uses bounding boxes from the successive input frames to calculate a probability that those bounding boxes in successive input frames have a location that overlaps with the target bounding box in the initial input frame at step 206. The system uses the overlap calculation in comparison to a predetermined threshold value to determine if each successive input frame includes a bounding box that has a locational overlap with one or more target bounding boxes identified in previous input frames at step 208.

The calculated probability is based on an overlap value that represents the intersection over union between two or more target bounding boxes across subsequent input frames, with the intersection over union being derived from the areas of the bounding boxes and the x,y coordinates of the bounding boxes. For example, if a first target bounding box in the initial input frame and a second bounding box in a second input frame do not include an intersection over union (i.e., there is no overlap in the x,y coordinates of each bounding box), the system calculates an overlap value of 0.0 and determines that the face in the second bounding box in the second input frame is not consistent with the target face in the target bounding box in the first input frame. The system will then consider whether any other bounding boxes in the second input frame overlap in location with respect to the target bounding box in the first input frame.

However, if a detected face remains largely motionless across subsequent input frames of the input media, the resulting calculation of the overlap value is relatively high, such as greater than 0.9 on a scale of 0.0 to 1.0. With such a high overlap value, the system determines that the subsequent bounding boxes are related to the same target face. However, with greater degrees over movement of the target face (such as a character walking from one side of the view to the opposing side of the view during subsequent frames, or such as a character speaking with aggressive head movements), the system employs a threshold of approximately 0.2 to 0.5 for the calculation of the overlap value to accommodate for movement while ensuring that some overlap must exist between subsequent frames. As such, if the overlap value meets the threshold, the system determines that the target face is consistent with the detected faces in subsequent input frames. During experimentation, the value of 0.2 was found to output zero false negatives due to body and facial movement when used in analyzing input media including 25 input frames per second; however, it should be appreciated that the threshold may vary linearly with input media including different amounts of input frames per second. For example, at 50 fps, the overlap value threshold is 0.4.

While the above discussion focuses on situations in which a target face is found in subsequent frames without interruption, often during one or more input frames of an input media, a target face is not detected or at least partially and temporarily obscured before returning to view. If the system performed a singular and distinct analysis of each input frame in an independent manner, any obscuring of the target face or failure to detect the target face would result in a false negative that the target face is not present in the input frame. Moreover, the system would cease tracking the target face upon a determination of the false negative.

Accordingly, the system accommodates for temporary obscurement or temporary failure to detect the target face in one or more intermediate frames in the series of successive input frames by determining if the target face is redetected within a certain number of successive frames from the last detection at step 210. To clarify, the detection of the target face across input frames relies on the overlapping value of the bounding boxes between input frames. For example, in an embodiment, the target face is present and detected in a first input frame and in a fifth input frame, but is not detected in a second input frame, a third input frame, or a fourth input frame. Since the system previously performs the calculation of the overlap value, the system determines that the target face is consistent between the first input frame and the fifth input frame. However, a bounding box was not detected in a location in the second, third, or fourth input frames to suggest that the second, third, or fourth input frames include the target face. Yet, the target face could in fact be present in these input frames. To avoid this error, as provided in step 210, the system determines if the target bounding box in one or more of the input frames reappears within the successive input frames within a predetermined number of intermediate frames that fail to include a target bounding box. Put another way, the system determines if an interruption in the detection of the target face occurs within a predetermined threshold. Some embodiments of the present invention will consider if the target bounding box in one or more of the input frames reappears within the successive input frames within a predetermined timeframe rather than a number of input frames.

For the sake of brevity and clarity, the term "intermediate target non-detection input frame" or "intermediate TND input frame" will be used herein after in reference to an intermediate frame in which a bounding box is not identified (regardless of the reason) within the threshold overlapping value to be identified as a target bounding box containing the target face.

At some point, non-detection of target bounding boxes in successive input frames occurs because the target face being tracked is no longer present in the scene within the input media, which will result in a termination of the tracking of the target face for that particular segment of the plurality of frames. Thus, the present invention includes a threshold determination for continuing trajectory analysis or concluding that the target face is no longer present in the series of input frames. The threshold for terminating trajectory analysis can be based on the number of intermediate TND input frames and/or the number of seconds between detections. The threshold number of intermediate TND input frames is a predetermined number of frames, e.g., 5 frames. In some embodiments, the threshold is between 3 and 11 frames. If there are more than 11 intermediate TND input frames, the system determines that the target face is no longer present and stops tracking the target face in that particular series of successive input frames and stores the bounding box and facial landmark data for the target face as a stream of related data. If the target face reappears in later input frames, the system reinitiates trajectory analysis and stores the resulting data as a separate data stream from the previous data stream. Likewise, in an embodiment, if the system fails to detect the target face for a predetermined time, e.g., 2-4 seconds worth of input frames, the system terminates the trajectory analysis for the target face. In some embodiments, the threshold is between 0.2 and 2.0 seconds. If the target face subsequently appears in the input media after such a termination, the system begins tracking the target face in a subsequent trajectory analysis.

Referring now to FIG. 3, to overcome the problem in which the target face reappears within the threshold for intermediate TND input frames, the system calculates a trajectory of the target face after calculating the overlap value for related input frames. More specifically, the system calculates the trajectory of the target face by calculating and comparing the overlap value between input frames during which the target face is detected and the relative locations of the bounding boxes and facial landmarks are stored during the facial processing analysis at step 302. In considering the previous example in which the system determines that the target face is consistent between the first input frame and the fifth input frame but not detected in the second input frame, the third input frame, or the fourth input frame; the system compensates by calculating a first facial processing analysis for the first input frame, and calculating a second facial processing analysis for the fifth input frame, to determine the bounding box location and one or more facial landmarks for each of the first input frame and the fifth input frame at step 302.

The number of input frames the systems uses before and after the intermediate TND input frames is a at least 1 frame before and after. However, some embodiments will use a greater number of frames before and after the intermediate TND input frames if available. Some embodiments use 5 and some use as many as available while others use a predetermined number falling within a range of 3-11. The term "preceding input frames" refers to input frames before the intermediate TND input frame(s) and "succeeding input frames" refers to input frames after the intermediate TND input frame(s) within the successive series of input frames.

Next, the system calculates an average location of the bounding box and facial landmarks across the predetermined number of preceding and succeeding input frames at step 304. The average values are then evenly distributed across the intermediate TND input frame(s) to extrapolate the locations of the bounding boxes and the facial landmarks at step 306.

Considering the example above, the resulting average of the analyses for the first input frame and the fifth input frame is the predicted location of the bounding box and facial landmarks for the third input frame, which forms a median between the first input frame and the fifth input frame. Similarly, a 25% weighted locational average (with the first input frame being the reference point for the skewing) of the bounding box and facial landmarks of the first input frame and the fifth input frame results in a predicted location of the bounding box and the facial landmarks for the second frame. Likewise, a 75% weighted average (with the fifth input frame being the reference point for the skewing) of the first input frame and the fifth input frame results in a predicted location of the bounding box and facial landmarks for the fourth frame. It should be appreciated that the averaging calculation can be performed on different amounts of intermediate TND input frame(s), with the averaging calculation being adjusted for the number of intermediate TND input frame(s).

As alluded to above, the system predicts the facial landmarks for each intermediate TND input frame. For example, in the embodiment in which the target face is detected in the first input frame and in the fifth input frame, the average of the first input frame and the fifth input frame not only outputs a determination that the target face is present in the third input frame, but also outputs an average of the facial landmarks of the first input frame and the fifth input frame. Similar to determining the bounding box location, the average of the facial landmarks is determined based on coordinates in x,y or in x,y,z, including coordinate locations ranging from 68 to 30,000 individual coordinates, thereby creating a comprehensive location-based analysis of the detected facial landmarks in each input frame. Similarly, the weighted averages result in outputted weighted averages of the facial landmarks. As such, the system outputs a continuous set of facial landmarks for a target face that progresses in motion from the first input frame through the fifth input frame, such that the target face is altered by the system during the intermediate TND input frames to form a continuous progression of facial landmarks.

The system can input the facial landmarks and/or bounding box in overlaying fashion on the intermediate TND input frames to allow the system or a user to assess the accuracy of the facial trajectory predictions. In addition, the system can provide a user with the option to manually override the location of the bounding box and/or facial landmarks by moving the location of said points or by removing them altogether. Likewise, the system can provide a user with the ability to terminate the facial trajectory tracking for a target face within a series of input frames when the user determines that the target face is no longer present.

The calculations referred to in the section above can be referred to as a trajectory analysis of a target object, such as a target face, such that the system maintains tracking of the target face even during intermediate TND input frames. As such, the system continues tracking the target face including during intermediate TND input frames that represent a failure to detect the target face, a temporary absence of the target face, or a partial or complete obscurement of the target face (including in a situation in which a secondary face intervenes in front of the target face). To accomplish this, the system not only tracks the target face through position-based analyses, but also through facial landmark analyses of each detected face within a series of input frames. As such, the system outputs a trajectory analysis based on a singular target face based on both position-based analyses and facial landmark analyses to couple the target face with position and landmark characteristics, thereby consistently tracking the singular target face.

In some instances, an input frame may include one or more faces having bounding boxes that meets the overlap threshold with the bounding box of the target face in a preceding input. Thus, some embodiments of the present invention include steps for identifying which overlapping bounding box contains the target face and which contains a different face. These additional steps include first identifying more than one bounding box in a successive frame that meets the overlap threshold with the bounding box of the target face in a preceding input frame at step 420. The steps further include identifying and storing the relative location of a plurality of facial landmarks of the target face in at least an initial input frame at step 404. The relative locations of the plurality of facial landmarks will typically remain the same or vary only slightly for the same target face depicted in various input frames. Thus, the relative locations of the plurality of facial landmarks provide a good indication of whether a multitude of faces are the same face.

Some embodiments also or alternatively identify and store demographic and/or heuristic information for each target face and can use the same to determine which of the multiple overlapping bounding boxes contain the target face. Thus, some embodiments include, for the first input frame of the plurality of input frames, calculating one or more pieces of demographic information associated with each target face and associating the calculated one or more pieces of demographic information with the first input frame. Demographic information may include elements such as prediction of race/age/gender/facial attributes and/or may include similarity information from a Siamese network (such as that provided by FaceNet) or other contrastive learning network (such as that provided by SimCLR) and/or the outputs of perceptual layers of a classification network (such as that provided by VGGFace). Likewise, some embodiments include, for the first input frame of the plurality of input frames, calculating one or more image heuristic associated with each target face and associating the calculated one or more image heuristics with the first input frame. Image heuristics may include color histogram or LUTs (look-up tables), Hu-Moments, and gradient information.

The present invention then determines the relative facial landmark data, demographic, and/or heuristic information for each of the overlapping bounding boxes at step 406. Finally, at step 408, the present invention compares the relative facial landmark data, demographic, and/or heuristic information from a preceding target face with the same relative information from the overlapping bounding boxes and identifies the overlapping bounding box with the greatest agreement or with an agreement value that exceeds a predetermined threshold as being the bounding box containing the target face.

In some embodiments, the comparison of facial landmarks, demographic, and/or heuristic information is performed using facial identification algorithms. These systems are trained to use one or more characteristics of a face to identify the same face in different input frames.

Figure 5:
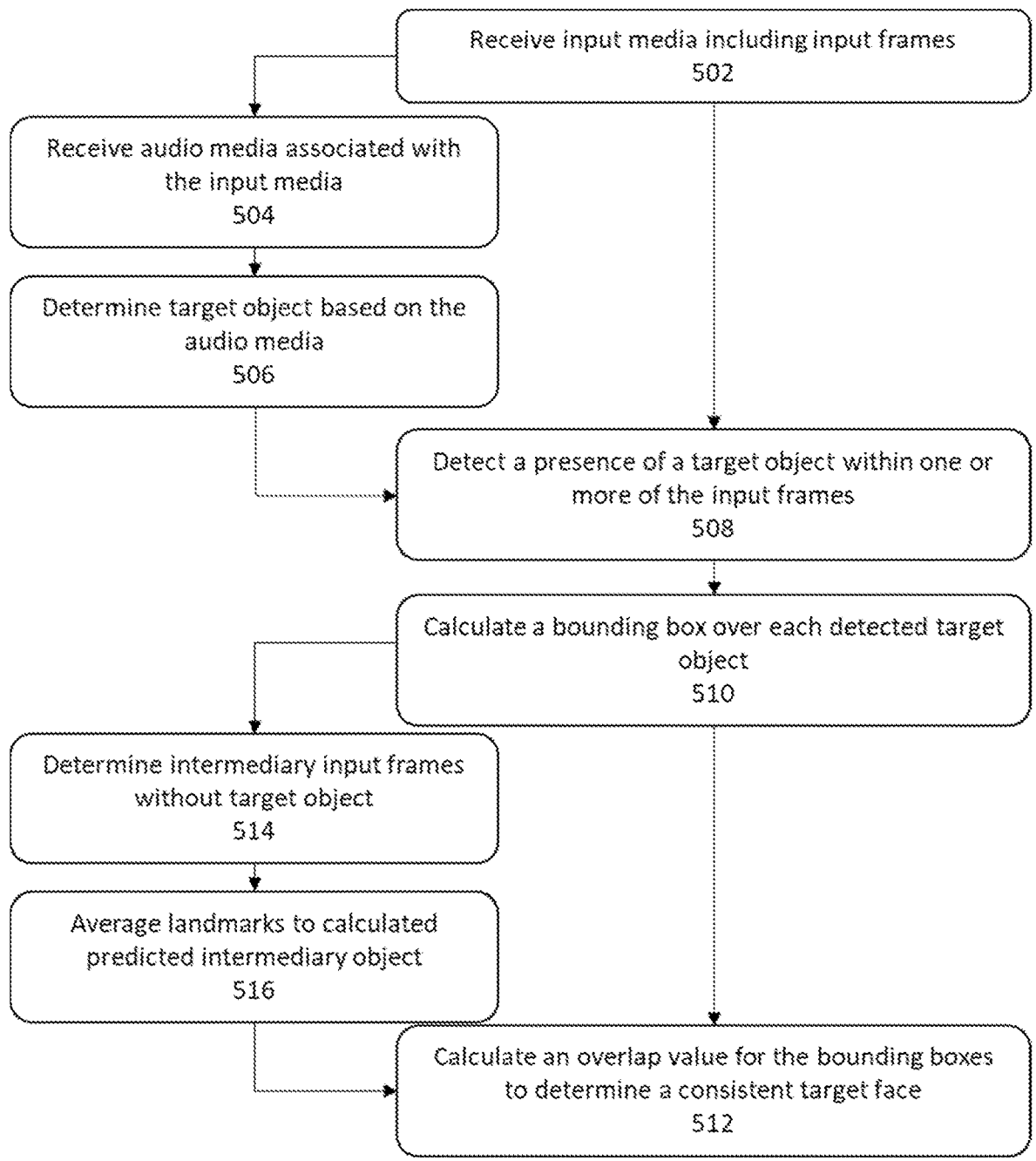
FIG. 5 is a process flow diagram depicting a method of tracking a target object, such as a face, across subsequent input frames of an input media, in accordance with an embodiment of the present invention.

Referring now to FIG. 5. in an embodiment, the system receives an audio file that is associated with the input media including the plurality of input frames at step 502. For example, in an embodiment, the input media is an audio/video segment including both visual characteristics and audial characteristics. Moreover, in some embodiments, it is desired to isolate a speaker that is shown in one or more input frames of the input media, such as in embodiments in which an image and video manipulation process is run on the input media to sync facial movements, such as lip and mouth movements, to the outputted audio associated with the input media. In such an embodiment, the target face is the face that is associated with the speaker that is displayed in the input media. To improve computational speed and reduce computational requirements, in some embodiments, the system filters out or simply ignores any object that is detected within the segment of the input media that is not associated with a speaker, such that the system focuses the trajectory analysis on the speaker. Moreover, to similarly improve computational speed and reduce processing requirements, in some embodiments, the system filters out or ignores any object that appears in fewer than a threshold number of input frames (such as filtering out an object that appears in only four subsequent frames). Accordingly, in some embodiments, the system performs the trajectory analysis on a singular target face that is associated with an audio component of the input media.

Returning to the initial facial detection steps described in detail above, current methods that attempt to detect faces in singular frame fail to differentiate between faces that share landmarks, such as those belonging to humans who share features (such as identical twins) and those related to reflections of a face in another projected medium, such as a mirror or a body of water that is depicted in the input media. When analyzing still images that are independent from each other, traditional systems are incapable of distinguishing between such similar faces. However, since the systems and methods described herein can be used on input media files including a plurality of input frames, the system creates a separate trajectory analysis for each identical twin or for the target face and the reflected face. The separate trajectory analysis results from one or more of the x,y coordinates of each component (i.e., each identical twin has a unique set of associated x,y coordinates associated therewith based on a location of the twin within the input frame) and the facial landmarks across subsequent frames (i.e., different facial expressions will result in a different trajectory). Accordingly, the different trajectory analyses outputted by the system differentiate between target objects that appear similar in a still image, but that belong to different object across a plurality of input frames.

As provided in FIG. 5, in conjunction with the descriptions above, an exemplary process-flow diagram is provided, depicting a method of tracking a target object, such as a face, across subsequent input frames of an input media. The steps delineated in the exemplary process-flow diagram of the FIG. 5 are merely exemplary of an order of tracking a target object. The steps may be carried out in another order, with or without additional steps included therein.

As exemplified in FIG. 5, the method starts at step 502, which includes the system receiving an input media including a plurality of input frames. During an optional step 504, the system receives an audio media that is associated with the input media; the audio media may be in a language that differs from that of the input media, such that facial movements in the input media do not match that of the displayed input media. During an optional step 506, the system determines a target object that is based on the audio media; in an embodiment, the target object is a speaker that is displayed in the input media.

After receiving the input media, the system detects a presence of a target object within one or more of the input frames of the input media during step 508. Embodiments of the system perform this step through x,y coordinate analyses to determine a position of the target object across input frames of the input media; similarly, embodiments of the system utilize facial processing, such as facial detection and/or facial landmark analyses, to determine a presence of a target object. Moreover, in some embodiment, the audio media is used to determine the presence of the target object within one or more of the input frames of the input media.

Next, during step 510, the system calculates a bounding box that is placed around each detected target object from step 508, described in greater detail above. During step 512, the system calculates an overlap value for bounding boxes across the input frames to determine a presence of a consistent target object across the input frames; if the overlap value meets a threshold (such as 0.2 on a scale of 0.0 to 1.0), the system outputs a result that the target object is consistent across the input frames. In the event that the target object is temporarily not detected or absent from one or more intermediary input frames, the system determines the input frames in which the target object is absent during step 514 as described herein in previous paragraphs. Next, during step 516, the system averages the locational information (including one or more landmark characteristics of the target object such as the facial landmarks as described in detail above) to output a calculated predicting intermediary object (such as a face). As such, the system not only detects and tracks a trajectory of the target object across input frames, but is also capable of predicting an intermediary object if the target object is temporarily absent or not detected from a plurality of input frames.

It should be noted that while the present invention is particularly useful in tracking facial trajectories to predict the location of a target face on intermediate TND input frames using bounding boxes and facial landmarks, the present invention can be used to track other objects other than faces using bounding boxes and landmark points.

In addition to tracking locational data, some embodiments of the present invention use the bounding box and/or facial landmarks (both detected and predicted) to execute cropping and aligning steps. The cropping and aligning is an important step to execute high quality facial manipulation. The cropping and aligning steps include cropping the target faces based on the bounding boxes in each input frame and adjusting the orientation of the target faces in the series of input frames based on the identified facial landmarks detected in the cropped input frames, so that the target face in each of the series of input frames is in a standard orientation, thereby creating a plurality of aligned target crop frames. The standard orientation may include the target faces looking straight ahead in the center of the cropped input frame. In addition, the present invention may pad the target face in one or more of the input frames after the target face is in the standard orientation. Facial landmarks can then be detected on the target faces in each of the aligned target crop frames. Using the facial landmarks in the aligned target crops, the present invention manipulates one or more facial features of the target face in one or more of the aligned target crop frames, thereby creating a plurality of synthetic target faces. Finally, the orientation of each of the synthetic target faces is reverted to an original orientation of each corresponding input frame. The reversion of the orientation of each of the synthetic target faces is based on measured movements of the facial landmarks of the target face between the corresponding input frame and aligned target crop frame.

Because the present invention is able to predict a bounding box and facial landmarks for the intermediate TND input frames, the present invention ensures that the target faces in the intermediate TND input frames are modified in accordance with the target faces preceding and succeeding the intermediate TND input frames. Without the trajectory analysis of the present invention, the target faces in the intermediate TND input frames would not be modified and would cause noticeable errors in the resulting synthetic media with facial manipulation outputs.

The cropping and aligning step can be executed by a cropping and alignment module ("CA module"). The CA module can be an affine transformation such as a simple image rotation of a certain angle based on the angle made between the target face's eyes. Additionally, the CA module may use an affine transformation that includes rotation, translation, scale transformations, or other linear transformations executed by remapping certain facial landmark points or anchor points to a desired location.

In performing the cropping step, the system relies on the identified or predicted location of the bounding boxes for each of the target faces in each of the input frames as determined in previous steps. The cropping step can further include the following steps for each input frame: analyzing the location of the facial landmark points within the bounding box in each input frame and determining the required degree of rotation/reorientation to determine where the facial landmark points will end up within the bounding box after the target face is aligned. The additional steps include adjusting the size of the bounding box or size of certain sides of the bounding box to ensure that the target face will reside within the bounding box when aligned. The size adjustment can be as an overlay with respect to the original input frame or can be in the form of padding the frame after cropping. Furthermore, these additional steps can be performed on each input frame independently resulting in the aligned target crop frames having different sizes from one frame to another based on the required adjustments.

With respect to the alignment portion of this step, the present invention relies on the facial landmark points in each frame and/or smoothed facial landmark points in each frame. Using the landmark points, the present invention adjusts the orientation of the target face in each input frame so that the faces are all oriented in a standard orientation.

The present invention can use a plurality of landmark points on the target face to execute the aligning step. In one example, the plurality of points includes the center of the nose, center of both eyes, and both sides of the mouth. The target face in each frame is rotated as needed so that the points are all in a similar location from one frame to another. For example, the target faces across the frames could be adjusted so that the line extending between the center points of the eyes is horizontal across all frames. A standard orientation may be a predetermined orientation in which the target face is centered and rotated so that the face is generally oriented to face perpendicular to the frame, i.e., the face is looking straight ahead.

In order to ensure that each aligned face is centered in each cropped frame, the aligned target crop frames can be independently padded as needed to relocate the aligned target faces in the center of the aligned target crop frames. The padding steps can be performed similar to the previously described padding steps.

The extent of any alignment/orientation is recorded for each input frame. The recorded data may include rotational or linear movement within two or three dimensions and is based on the detected facial landmarks and/or the coordinate system of the image. It may be recorded as a "homography" and/or transformation matrix. These recorded parameters are used to revert the orientation following facial manipulation. Thanks to the present invention, the output synthetic media file includes consistent facial manipulation across all input frames including those in which the target face was not originally detected.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C #, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of tracking a target face across successive input frames of an input media, the method comprising the steps of:
    acquiring a plurality of input frames corresponding to the input media;
    detecting a presence of the target face within at least a subset of input frames from the plurality of input frames;
    determining a location of the target face in each of the input frames in which the target face was detected;
    determining an interruption in detection of target faces in one or more intermediate input frames in the plurality of input frames and determining if the interruption meets a predetermined threshold value;

responsive to determining that the interruption meets the predetermined threshold:

identifying a location of a target bounding box on a predetermined number of input frames preceding the interruption, wherein each target bounding box has an area determined by the target face and at least partially encloses the target face;

identifying a location of one or more facial landmarks associated with the target face for each of the preceding input frames;

identifying a location of a target bounding box on a predetermined number of input frames succeeding the interruption, wherein each target bounding box has an area determined by the target face and at least partially encloses the target face;

identifying a location of one or more facial landmarks associated with the target face for each of the succeeding input frames;

calculating a predicted location of a predicted bounding box on each of the intermediate input frames on which there was an interruption in the detection of the target face, wherein the predicted location is based on the identified locations of the target bounding boxes on the preceding input frames and the succeeding input frames; and calculating a predicted location of one or more facial landmarks of the target faces on each of the intermediate input frames on which there was the interruption in the detection of the target face, wherein the predicted location is based on the identified locations of the one or more facial landmarks of the target faces on the preceding input frames and the succeeding input frames.

2. The method of claim 1, wherein detecting the presence of the target face within at least the subset of input frames from the plurality of input frames includes:

detecting a presence of any faces within each of the plurality of input frames;

computing bounding boxes for each face detected in each input frame of the plurality of input frames and identifying the location of each bounding box in each input frame;

calculating an overlap value between a first bounding box on an initial input frame and each of the bounding boxes in successive input frames, the overlap value based on an intersection over union between the first bounding box and the bounding boxes in the successive input frames;

determining if the overlap value between the first bounding box and any bounding boxes in successive input frames meets a threshold value; and when the overlap value for a particular bounding box meets the threshold value, confirming that the target face has been detected in the successive frame on which the particular bounding box is located.

3. The method of claim 2, further including, responsive to detecting multiple bounding boxes in a particular successive input frame that meet the threshold overlap value:

comparing a relative location of one or more facial landmarks of the target face in the initial input frame with a relative location of one or more facial landmarks of each face in each of the multiple bounding boxes to ensure a threshold level of agreement between the relative locations of the one or more facial landmarks of the initial input frame with the relative locations of the one or more facial landmarks of the successive input frame; and based on meeting the threshold agreement between the relative locations one or more facial landmarks of the initial input frame with the relative locations one or more facial landmarks of one of the multiple bounding boxes, identifying the bounding box that meets the threshold agreement as a correct bounding box having the target face.

4. The method of claim 2, wherein the threshold overlap value is at least 0.2 per 25 frames per second.

5. The method of claim 1, wherein the predetermined threshold in the interruption in the detection of target faces in one or more intermediate input frames is equal to or less than 11 frames.

6. The method of claim 1, wherein the predetermined threshold in the interruption in the detection of target faces in one or more intermediate input frames is equal to or less than 4 seconds.

7. The method of claim 1, wherein the predetermined number of preceding input frames used in calculating the predicted location of the predicted bounding box and predicted facial landmarks on each of the intermediate input frames is at least 1 and up to 5 preceding input frames.

8. The method of claim 1, wherein the predetermined number of succeeding input frames used in calculating the predicted location of the predicted bounding box and predicted facial landmarks on each of the intermediate input frames is at least 1 and up to 5 succeeding input frames.

9. The method of claim 1, providing image content in each of the predicted bounding boxes to a crop-align generator.

10. The method of claim 1, providing the predicted location of the predicted bounding box and predicted facial landmarks on each of the intermediate input frames to a crop-align generator.

11. The method of claim 1, further comprising a step of receiving an audio media that is associated with the input media.

12. The method of claim 11, wherein the step of detecting the presence of the target face further comprises detecting an audio component of the audio media that is associated with the target face, such that the target face is associated with an audio output.

13. The method of claim 1, wherein calculating the location of the predicted bounding box includes:

calculating an average location of the bounding boxes from the identified locations of the bounding boxes on the preceding input frames and the succeeding input frames; and extrapolating the average location of the bounding boxes across the one or more intermediate input frames on which there was an interruption in the detection of the target face.

14. A facial tracking system for tracking a trajectory of a target face across input frames of an input media, the target face tracking system comprising:

a processor; and a non-transitory computer-readable medium operably coupled to the processor, the computer-readable medium having computer-readable instructions stored thereon that, when executed by the processor, cause the facial tracking system to track the target face across input frames of the input media by executing instructions comprising:

acquiring a plurality of input frames corresponding to the input media;

detecting a presence of the target face within at least a subset of input frames from the plurality of input frames;

determining a location of the target face in each of the input frames in which the target face was detected;

determining an interruption in detection of target faces in one or more intermediate input frames in the plurality of input frames and determining if the interruption meets a predetermined threshold value;

responsive to determining that the interruption meets the predetermined threshold:

identifying a location of a bounding box on a predetermined number of input frames preceding the interruption, wherein each bounding box has an area determined by the target face and at least partially encloses the target face;

identifying a location of one or more facial landmarks associated with the target face for each of the preceding input frames;

identifying a location of a bounding box on a predetermined number of input frames succeeding the interruption, wherein each bounding box has an area determined by the target face and at least partially encloses the target face;

identifying a location of one or more facial landmarks associated with the target face for each of the succeeding input frames;

calculating a predicted location of a predicted bounding box on each of the intermediate input frames on which there was an interruption in the detection of the target face, wherein the predicted location is based on the identified locations of the bounding boxes on the preceding input frames and the succeeding input frames; and calculating a predicted location of one or more facial landmarks on each of the intermediate input frames on which there was the interruption in the detection of the target face, wherein the predicted location is based on the identified locations of the one or more facial landmarks on the preceding input frames and the succeeding input frames.

15. The system of claim 14, wherein the processor further executes the following steps when detecting the presence of the target face within at least the subset of input frames from the plurality of input frames includes:

detecting a presence of any faces within each of the plurality of input frames;

computing bounding boxes for each face detected in each input frame of the plurality of input frames and identifying the location of each bounding box in each input frame;

calculating an overlap value between a first bounding box on an initial input frame and each of the bounding boxes in successive input frames, the overlap value based on an intersection over union between the first bounding box and the bounding boxes in the successive input frames;

determining if the overlap value between the first bounding box and any bounding boxes in successive input frames meets a threshold value; and when the overlap value for a particular bounding box meets the threshold value, confirming that the target face has been detected in the successive frame on which the particular bounding box is located.

16. The system of claim 15, wherein the processor further executes the following steps responsive to detecting multiple bounding boxes in a particular successive input frame that meet the threshold overlap value:

comparing a relative location of one or more facial landmarks of the target face in the initial input frame with a relative location of one or more facial landmarks of a face in the multiple bounding boxes to ensure a threshold level of agreement between the relative locations of the one or more facial landmarks of the initial input frame with the relative locations of the one or more facial landmarks of the successive input frame; and based on meeting the threshold agreement between the relative locations one or more facial landmarks of the initial input frame with the relative locations one or more facial landmarks of one of the multiple bounding boxes, identifying the bounding box that meets the threshold agreement as a correct bounding box having the target face.

17. The system of claim 14, wherein the predetermined threshold in the interruption in the detection of target faces in one or more intermediate input frames is equal to or less than 11 frames or equal to or less than 4 seconds.

18. The system of claim 14, wherein the predetermined number of preceding input frames and succeeding input frames used in calculating the predicted location of the predicted bounding box and predicted facial landmarks on each of the intermediate input frames is at least 1 and up to 5 input frames.

19. The system of claim 14, providing image content of each of the predicted bounding boxes, the predicted location of each of the predicted bounding boxes, and the predicted facial landmarks from each of the predicted bounding boxes to a crop-align generator.

20. The system of claim 14, wherein the processor calculates the location of the predicted bounding box by:

calculating an average location of the bounding boxes from the identified locations of the bounding boxes on the preceding input frames and the succeeding input frames; and extrapolating the average location of the bounding boxes across the one or more intermediate input frames on which there was an interruption in the detection of the target face.

* * * * *